United States Patent
Vargantwar et al.

(10) Patent No.: US 8,270,966 B1
(45) Date of Patent: Sep. 18, 2012

(54) REDUCING MOBILE DEVICE ROAMING

(75) Inventors: Sachin R. Vargantwar, Overland Park, KS (US); Manoj Shetty, Overland Park, KS (US); Bhagwan Singh Khanka, Lenexa, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 680 days.

(21) Appl. No.: 12/394,348

(22) Filed: Feb. 27, 2009

(51) Int. Cl.
 *H04W 24/00* (2009.01)
(52) U.S. Cl. ............... 455/423; 455/432.3; 455/436
(58) Field of Classification Search .......... 370/338, 370/401; 455/433, 432.1, 437, 445, 413, 455/432.2; 379/114.28, 114.29; 380/248
See application file for complete search history.

(56) References Cited

U.S. PATENT DOCUMENTS

| | | | |
|---|---|---|---|
| 6,085,087 A * | 7/2000 | Hori et al. .................. 455/434 |
| 6,516,194 B2 | 2/2003 | Hanson | |
| 7,079,849 B2 * | 7/2006 | Hanson .................... 455/456.1 |
| 7,167,707 B1 | 1/2007 | Gazzard et al. | |
| 7,245,913 B1 * | 7/2007 | Nguyen et al. .............. 455/435.2 |
| 2003/0139187 A1 * | 7/2003 | Zhang et al. .................. 455/445 |
| 2006/0079225 A1 * | 4/2006 | Wolfman et al. .......... 455/432.1 |
| 2006/0172733 A1 | 8/2006 | Benco et al. | |
| 2008/0001735 A1 * | 1/2008 | Tran ........................ 340/539.22 |
| 2008/0062922 A1 | 3/2008 | Qi | |
| 2008/0170525 A1 | 7/2008 | Geiger | |

OTHER PUBLICATIONS

First Action Interview Pilot Program, m. Jul. 18, 2011, U.S. Appl. No. 12/394,252, 6 pp.

* cited by examiner

*Primary Examiner* — Nick Corsaro
*Assistant Examiner* — Mahendra Patel

(57) ABSTRACT

A method, system, and computer-readable media are provided for reducing mobile device roaming. A set of transition mobile-network attributes are captured by an idle mobile device before switching from a roaming network to a home network. A collection of transition mobile-network attributes are used to generate transition-based data. Active mobile-network attributes are compared to the transition-based data and used to recognize when the mobile device is within an area that can receive one or more services from the home network.

18 Claims, 4 Drawing Sheets

REDUCING MOBILE DEVICE ROAMING

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, one or more computer-readable media having computer-executable instructions embodied thereon for performing perform a method for reducing mobile device roaming when the mobile device is in an idle mode while utilizing a roaming network. The method includes determining that a home network of the mobile device is available to provide services to the mobile device. Based on the determination that the home network is available to provide services to the mobile device, transition mobile-network attributes are captured. The transition mobile-network attributes are parameters of the roaming network in association with the mobile device at or near the time it is determined that the home network is available to provide services to the mobile device. The transition mobile-network attributes are utilized to generate transition-based data that characterize the transition mobile-network attributes.

In a second aspect, one or more computer-readable media having computer-executable instructions embodied thereon for performing a method for reducing mobile device roaming when the mobile device is in an active mode while utilizing a roaming network. The method includes referencing active mobile-network attributes. The active mobile-network attributes are associated with parameters of the mobile device and the roaming network when the mobile device is using the roaming network for an active call. Stored transition-based data are referenced. Each of the transition-based data comprises a calculation of a set of transition mobile-network attributes associated with parameters of the mobile device and the roaming network before the mobile device previously roaming in an idle mode switched from the roaming network to a home network. The active mobile-network attributes are compared to the corresponding transition-based data to determine whether the active mobile-network attributes match the transition based data at least to an extent. Based on the comparison, it is recognized that the mobile device is within an area that can receive one or more services from the home network.

In a third aspect, one or more computer-readable media having computer-executable instructions embodied thereon that, when executed, perform a method for reducing mobile device roaming. The method includes capturing transition mobile-network attributes that are parameters of a roaming network being used by the mobile device in idle mode in accordance with a determination that a home network of the mobile device is available to provide services to the mobile device. The transition mobile-network attributes are utilized to obtain transition-based data that characterize the transition mobile-network attributes. The transition-based data are stored. An active phone call is initiated via the mobile phone using the roaming network. The stored transition-based data and corresponding active mobile-network attributes are referenced. The active mobile-network attributes are associated with parameters of the mobile device and the roaming network when the mobile device is on the active phone call using the roaming network. It is recognized that at least a portion of the stored transition-based data match at least to an extent the corresponding active mobile-network attributes. Based on the recognition, the mobile device on the active phone call is transferred from the roaming network to the home network.

BRIEF DESCRIPTION OF THE SEVERAL VIEWS OF THE DRAWING

Illustrative embodiments of the present invention are described in detail below with reference to the attached drawing figures, and wherein.

DETAILED DESCRIPTION OF THE INVENTION

Figure 1:
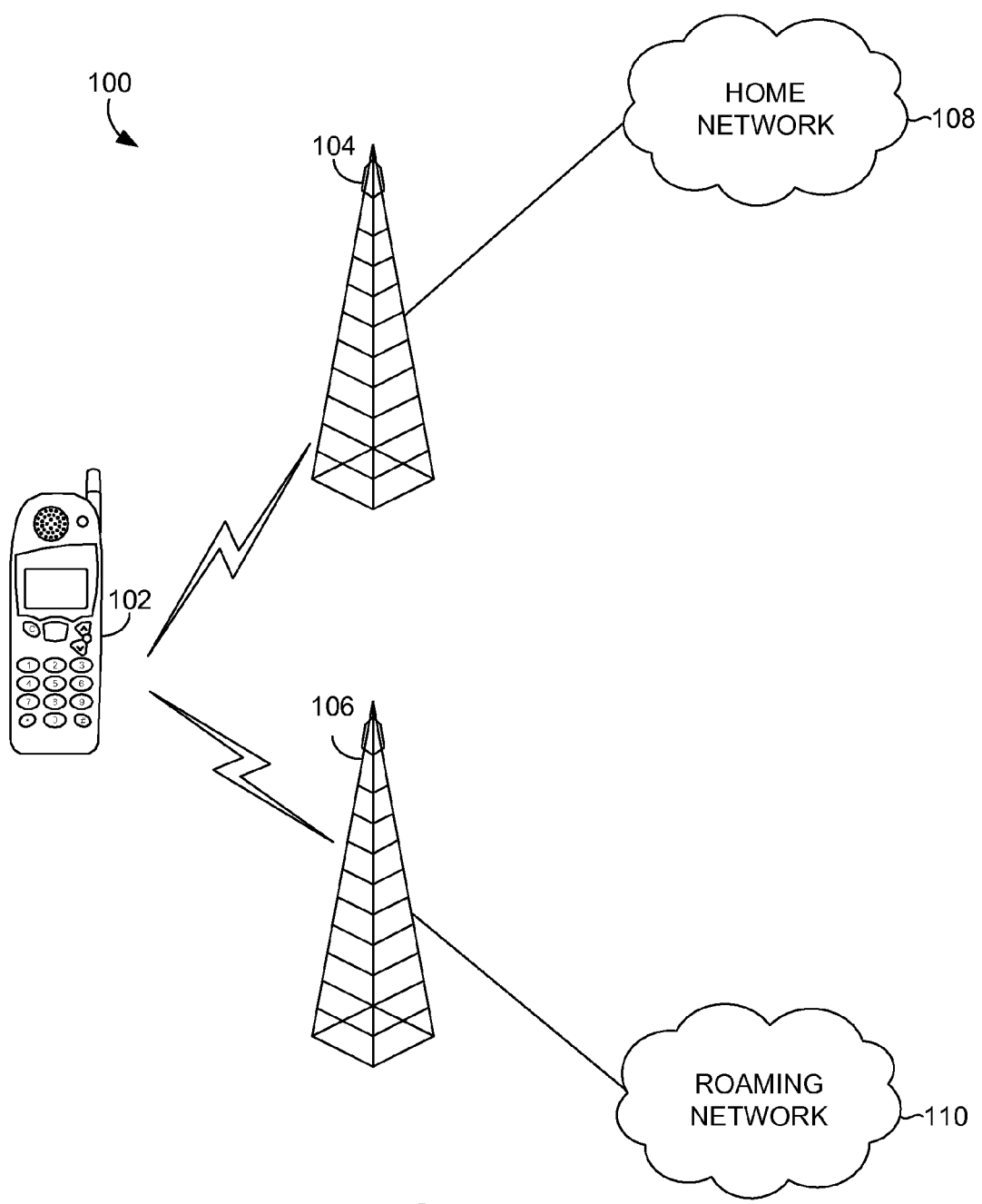
FIG. 1 is an exemplary network environment for practicing an embodiment of the present invention.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| CD | Compact Disc |
| CD-ROM | Compact Disk Read Only Memory |
| DVD | Digital Versatile Discs |
| Ec/Io | Pilot strength/total interference |
| EEPROM | Electrically Erasable Programmable Read Only Memory |
| NID | Network Identification |
| PN | Pseudo Noise |
| RAM | Random Access Memory |
| ROM | Read Only Memory |
| SID | System Identification |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for reducing mobile device roaming. Mobile device roaming refers to a mobile device utilizing a roaming network to obtain services, such as voice services (e.g., enable a mobile device to make and/or receive voice calls) and/or data services (e.g., enable a mobile device to send and/or receive data). As such, a mobile device that is roaming uses a roaming network rather than a home network to communicate with another computing device, such as a mobile device, a server, a personal computer, or the like.

Generally, a mobile device within a coverage area of a home network utilizes the home network to obtain services. That is, in instances where a mobile device is within a coverage area of a home network, the home network generally provides services to the mobile device. In some cases, however, the mobile device might utilize services of a roaming network even though the home network is capable of providing services to the mobile device. For instances, assume that a mobile device initiates a phone call utilizing a roaming network because the home network is unavailable (e.g., the mobile device is outside the geographical coverage area of the home network). Assume that, upon origination of the phone call, the mobile device is transferred to another location that is capable of receiving services from both the roaming network and the home network. In such a case, embodiments of the present invention enable the mobile device to transfer (e.g., initiate a handoff) from the roaming network to the home network and, thereby, reduce mobile device roaming. As such, rather than maintaining usage of the roaming network until termination of the phone call even though services can be provided by the home network, the mobile device can begin using the home network during the phone call to reduce or limit time (e.g., minutes of use) or costs (e.g., costs to the mobile device user or costs to the service provider of the home network) associated with utilizing the roaming network.

Referring to the drawings generally, and initially to FIG. 1 in particular, an exemplary network environment for practicing an embodiment of the present invention is provided and designated generally by numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. As shown in FIG. 1, an exemplary network environment 100 includes a mobile device 102 that can communicate with another computing device (not shown), such as, for example, a mobile device, a personal computer, a server, etc. The mobile device 102 of FIG. 1 can be any mobile computing device that communicates by way of a wireless network (e.g., a wireless telecommunications network). As such, the mobile device 102 may take on a variety of forms, such as a laptop computer, a mobile phone, a personal digital assistant (PDA), a portable media player (PMP), or any other mobile device that is capable of communicating via a wireless network. Makers of illustrative mobile devices include, for example, Research in Motion®, Creative Technologies Corp., Samsumg®, Apple® Computer, and the like. A mobile device can include, for example, a display(s), a power source(s) (e.g., a battery), a data store(s), a speaker(s), memory, a buffer(s), and the like.

The mobile device 102 communicates by way of a wireless transceiver, such as wireless transceiver 104 and/or wireless transceiver 106. A wireless transceiver serves as a transceiver for wireless communications between the mobile device 102 and a network, such as a home network 108 and/or a roaming network 110. Examples of wireless transceivers include, but are not limited to, a base station transceiver and a Node B. Additional examples of wireless transceivers include Wi-Fi and WiMax compatible transceivers. In embodiments, wireless transceivers 104 and/or 106 are considered a component of a corresponding wireless telecommunications network with which the mobile device 102 communicates. As such, wireless transceiver 104 might be a component of the home network 108, and wireless transceiver 106 might be a component of the roaming network 110.

The mobile device 102 communicates with other computing devices (e.g., a mobile device(s), a server(s), a personal computer(s), etc.) utilizing a network, such as the home network 108 and/or the roaming network 110. In embodiments, each of home network 108 and/or roaming network 110 are a wireless telecommunications network. A wireless telecommunications network refers to any type of telecommunications network that is wireless. Examples of a wireless telecommunications technologies that might be compatible with the home network 108 and/or the roaming network 110 include, but are not limited to Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PDCS). A wireless telecommunications network might include an array of devices or components, which are not shown so as to not obscure more relevant aspects of the invention. Components such as a base station, a communications tower, or even access points (as well as other components) can provide wireless connectivity in some embodiments. Home network 108 and/or roaming network 110 can include multiple networks, as well as being a network or networks, but is shown in more simple form so as to not obscure other aspects of the present invention.

The home network 108 is a wireless telecommunications network associated with a wireless telecommunications provider that provides services to the mobile device 102. In this regard, a home network is generally used to provide services to a mobile device when the mobile device is within the coverage area of the home network. Such services might include voice services that enable making and receiving voice calls, data services that enable sending and receiving data, or other services provided by a wireless telecommunications provider. In embodiments, a mobile device user enters into a contract with a wireless telecommunication provider in connection with a home network to obtain wireless services.

Accordingly, the mobile device, or user associated therewith, might be registered with the wireless telecommunications provider, or home network associated therewith, to receive wireless services.

The roaming network 110 is a wireless telecommunications network other than a home network of the mobile device that can provide services to the mobile device. A roaming network can be any wireless telecommunications network that a mobile device can establish a connection with other than the home network. Generally, a roaming network can provide services (e.g., voice services and/or data services) to a mobile device when the mobile device is outside geographical coverage of a home network of the mobile device. In embodiments, a wireless telecommunication provider in association with a home network contracts (e.g., via a roaming agreement) with a wireless telecommunications provider in association with a roaming network such that a mobile device can utilize a roaming network to obtain services, for example, in instances that the mobile device is outside of coverage of the home network. In such an embodiment, the mobile device, or mobile device user, might not be registered with the roaming network or the wireless telecommunications provider thereof.

The mobile device 102 might be located in an area (e.g., geographical area) such that it can receive services from the home network 108, the roaming network 110, or a combination thereof. By way of example only, a mobile device located at a first location within a coverage area of a home network might receive services from the home network. Assume that the mobile device is transferred to a second location within a coverage area of a roaming network. At the second location, the mobile device might be out of the area of services that can be provided by the home network and, as such, the mobile device might receive services using the roaming network. Assume now that the mobile device is transferred to a third location within an area of which services can be provided by both a home network and a roaming network. Generally, if the mobile device is within a coverage area of the home network, the home network will provide services to the mobile device. As previously discussed, in some cases, however, the mobile device might utilize services of a roaming network even though the home network is capable of providing services to the mobile device. For instance, assume that a mobile device places a phone call utilizing a roaming network because the home network is unavailable (e.g., the mobile device is outside the geographical coverage area of the home network). Assume that while on an active phone call the mobile device is transferred to another location that is capable of receiving services from both the roaming network and the home network. In such a case, embodiments of the present invention enable the mobile device to transfer from the roaming network to the home network and, thereby, reduce mobile device roaming. As such, rather than maintaining usage of the roaming network until termination of the phone call, the mobile device can begin using the home network during the phone call to reduce or limit time and/or costs associated with utilizing the roaming network.

Figure 2:
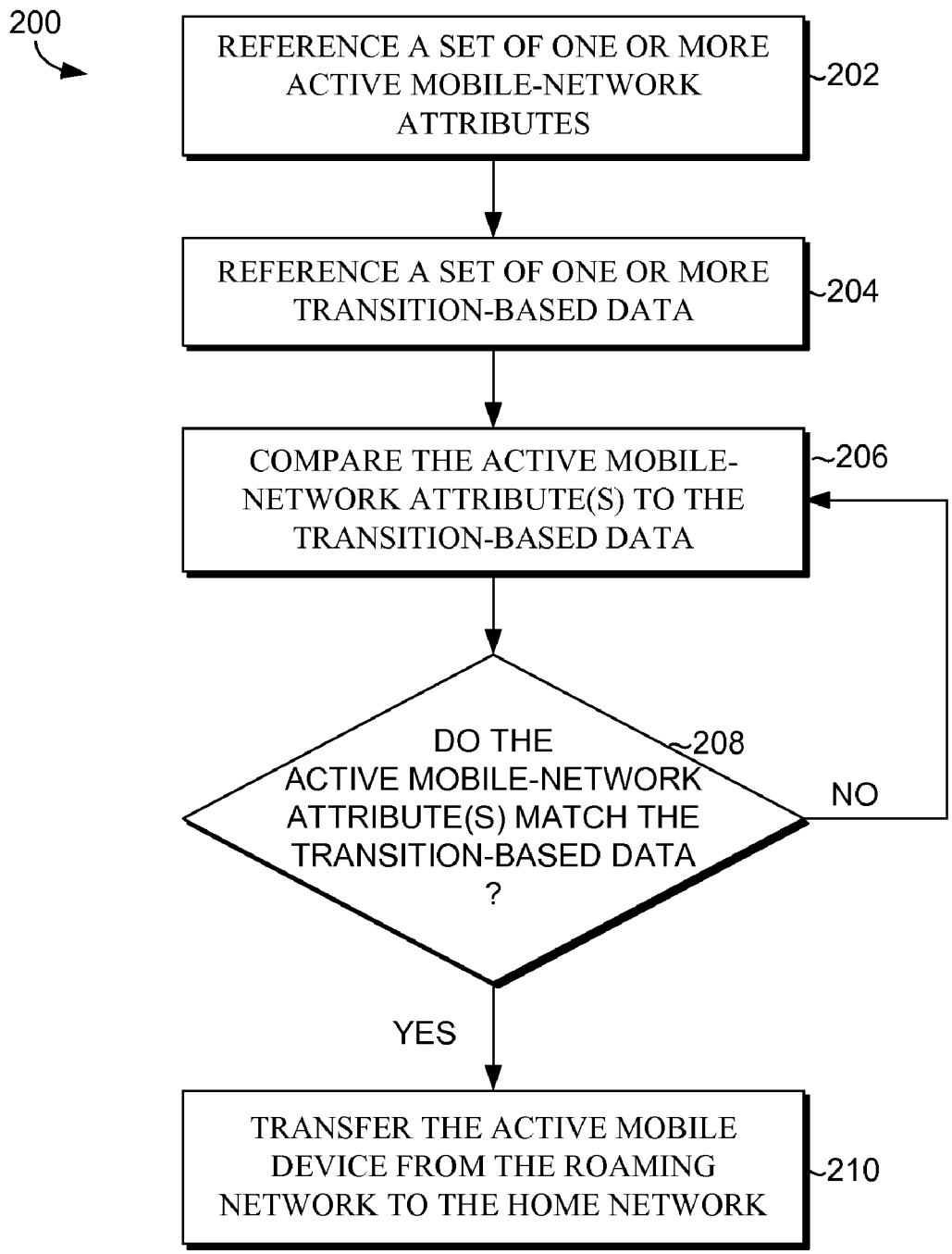
FIG. 2 is a flow diagram illustrating an exemplary method for reducing mobile device roaming, in accordance with an embodiment of the present invention.

Turning now to FIG. 2, a flow diagram is illustrated that shows an exemplary method 200 for reducing mobile device roaming. Initially, as indicated at step 202, a set of one or more active mobile-network attributes is referenced. In embodiments, a mobile device, such as the mobile device 102 of FIG. 1, references a set of one or more active mobile-network attributes. A mobile-network attribute refers to any attribute, characteristic, parameter, condition, or element related to a mobile device in accordance with a wireless communications network at a particular instance (e.g., moment in time, occurrence of an event, etc.). In one embodiment, a mobile-network attribute describes a radio frequency (RF) condition of a wireless communications network, such as a roaming network, relative to a mobile device. An active mobile-network attribute refers to a mobile-network attribute associated with or corresponding with an active mobile device connected to a network. In this regard, an active mobile-network attribute can describe a current or present condition or characteristic of a wireless communications network, such as a roaming network, relative to an active mobile device. An active mobile device, as used herein, refers to a mobile device operating in an active operation mode (i.e., an active mode). A mobile device in an active mode is a mobile device that is actively (e.g., presently or currently) utilizing services, such as voice services or data services of a wireless telecommunications network. For example, a mobile device is in an active mode (i.e., an active mobile device) when the mobile device is used for an active phone call, that is, a communication between the mobile device and another mobile device.

In one embodiment, the active mobile-network attributes are associated with or correspond with parameters of a roaming network. In such a case, active mobile-network attributes can describe current conditions or characteristics of a roaming network in relation to a mobile device. In another embodiment, the active mobile-network attributes are associated with or correspond with parameters of a home network. Accordingly, active mobile-network attributes can describe current conditions or characteristics of a home network in relation to a mobile device. Active mobile-network attributes might include, but are not limited to, location data and network data. Location data can be any data (e.g., x, y, and/or z coordinates, street, city, state, zip code, country, latitude, longitude, etc.) that provides a location of a mobile device. Network data can be any data that provides information regarding characteristics of a network (e.g. network identity, signal strength) in association with a mobile device. By way of example only, active mobile-network attributes may include latitude data, longitude data, active set pseudo noise (PN) data, active set PN signal strength data, neighbor set PN data, neighbor set PNs signal strength data, system identification (SID) data, network identification (NID) data, Ec/Io data (e.g. Pilot strength/total interference), or a combination thereof.

In embodiments, a set of one or more active mobile-network attributes are referenced by an active mobile device. As such, active mobile-network attributes are referenced by a mobile device while the mobile device is in an active mode, such as an active phone call. A mobile device can reference active mobile-network attributes by obtaining, receiving, retrieving, recognizing, or identifying such attributes. The active mobile-network attributes might be referenced periodically (e.g., after a lapse of a time), continuously, upon an occurrence of an event, or the like. In one embodiment, active mobile-network attributes are referenced upon a monitoring, detection, or recognition of current conditions of a wireless telecommunications network with respect to a particular mobile device. That is, active mobile-network attributes are referenced as they are monitored and/or recognized. In such a case, active mobile-network attributes can be monitored by the mobile device or other computing device (e.g., server(s)) associated with the wireless telecommunication network. As such, attributes might be referenced from data monitored or maintained on the mobile device or on a computing device remote from the mobile device, such as a server associated with a home network or a roaming network. As can be appreciated, in some cases, a plurality of active mobile-network attributes can be monitored, detected, or recognized, while a portion of such attributes are referenced.

At step 204, a set of one or more transition-based data is referenced. A transition-based data refers to any data that represents, describes, characterizes, or summarizes one or more transition mobile-network attributes. Accordingly, a transition-based data might represent an aggregation, sum, average, or other calculation of one or more corresponding or related transition mobile-network attributes. A transition mobile-network attribute refers to a mobile-network attribute in association with an occurrence of a network transition of an idle mobile device. A network transition refers to an instance that a mobile device receiving services from a wireless telecommunications network is transferred or transitioned to another wireless telecommunications network that provides services to the mobile device. That is, a mobile device receiving services from a first wireless telecommunications network transfers or transitions to a second wireless telecommunications network such that the second wireless telecommunications network provides services to the mobile device. An idle mobile device, as used herein, refers to a mobile device operating in an idle operation mode (i.e., an idle mode). A mobile device in an idle mode is a mobile device that is not actively utilizing services, such as voice services or data services of a wireless telecommunications network. For example, a mobile device is in an idle mode (i.e., an idle mobile device) when the mobile device is not being used for a phone call.

In one embodiment, a transition-based data is a single transition mobile-network attribute. In such a case, the transition-based data might be the most recent transition mobile-network attribute obtained or detected. In another embodiment, a transition-based data is generated from a collection of transition mobile-network attributes. To generate transition-based data, the transition mobile-network attributes might be combined, compared or averaged with past transition mobile-network attributes captured over a predetermined period. For example, a transition-based data might be an average of a group of corresponding transition mobile-network attributes. Such a group might be a particular number of the most recently monitored or obtained transition mobile-network attributes, all transition mobile-network attributes monitored in relation to a particular mobile device, transition mobile-network attributes associated with a plurality of mobile devices (e.g., all mobile devices of a network), etc.

In one embodiment, a transition-based data is associated with or corresponds with a roaming network. In such a case, a transition-based data can describe a condition or characteristic of a roaming network in relation to a mobile device at or near a time a mobile device is transitioned or transferred, for example, from the roaming network to a home network. In another embodiment, a transition-based data is associated with or corresponds with a home network. Accordingly, a transition-based data can describe a condition or characteristic of a home network in relation to a mobile device at or near a time a mobile device is transitioned or transferred, for example, from a roaming network to a home network. Transition-based data and/or transition mobile-network attributes might be based on location data and network data. Location data can be any data (e.g., x, y, and/or z coordinates, street, city, state, zip code, country, latitude, longitude, etc.) that provides a location of a mobile device. Network data can be any data that provides information regarding characteristics of a network. (e.g. network identity, signal strength) in association with a mobile device. By way of example only, transition-based data and/or transition mobile-network attributes may include latitude data, longitude data, active set pseudo noise (PN) data, active set PN signal strength data, neighbor set PN data, neighbor set PN signal strength data, system identification (SID) data, network identification (NID) data, Ec/Io data (e.g. Pilot strength/total interference), or a combination thereof.

In embodiments, a set of one or more transition-based data are referenced by an active mobile device. As such, transition-based data are referenced by a mobile device while the mobile device is in an active mode, such as an active phone call. A mobile device can reference transition-based data by obtaining, receiving, retrieving, recognizing, or identifying such data. The transition-based data might be referenced periodically (e.g., after a lapse of a time), continuously, upon an occurrence of an event, or the like. In one embodiment, transition-based data are stored and thereafter referenced. In such a case, transition-based data can be stored within the mobile device or other computing device (e.g., server(s)) associated with the wireless telecommunication network. As such, transition-based data might be referenced from data stored on the mobile device or on a computing device remote from the mobile device, such as a server associated with a home network or a roaming network. As can be appreciated, in some cases a plurality of transition-based data might be stored, while a portion of such data is referenced.

At step 206, the active mobile-network attributes are compared to corresponding transition-based data. In embodiments, at least a portion of the referenced active mobile-network attributes are compared to at least a portion of the referenced transition-based data. By way of example only, an active mobile-network attribute comprising a current location of an active mobile device might be compared to transition-based data that represents a location(s) of an idle mobile phone transitioning from a roaming network to a home network. A comparison of active mobile-network attributes and transition-based data can be utilized to detect or predict a likelihood that an active mobile device is about to enter or has recently entered an area where an idle mode transition from a roaming network to a home network previously occurred. That is, by utilizing the active mobile-network attributes and the transition-based data, a roaming mobile device in an active mode can predict when the mobile device enters a geographic area covered by the home network.

Based upon a comparison of active mobile-network attributes and transition-based data, at step 208, it is determined whether one or more of the active mobile-network attributes match one or more of the transition-based data. In one embodiment, an active mobile-network attribute matches a corresponding transition-based data in cases where the attribute and data are the same. In another embodiment, an active mobile-network attribute matches a corresponding transition-based data in cases where the attribute and data are within a particular threshold relative to one another or are similar to a particular extent. A determination of whether active mobile-network attributes match transition-based data can be made utilizing any algorithm or lookup system.

A determination of whether one or more active mobile-network attributes match one or more transition-based data might be based on whether any attributes match corresponding data, whether all attributes match corresponding data, whether a specific portion of attributes match corresponding data, whether a particular number of attributes match corresponding data, or the like. By way of example, it might be determined that one or more active mobile-network attributes match one or more transition-based data if a current location of an active mobile device matches a location transition-based data.

If it is determined at step 208 that one or more of the active mobile-network attributes do not match (e.g., are not the same as or similar to a particular extent) one or more of the transition-based data, the method returns to step 206 at which the active mobile network attributes are compared to the transition-based data. Such a determination provides an indication that the mobile device (e.g., an active mobile device) remains in a coverage area in which the home network does not provide services.

If, on the other hand, it is determined at step 208 that one or more of the active mobile-network attributes match one or more of the transition based data, the active mobile device is transferred from the roaming network to the home network at step 210. Such a determination provides an indication that the mobile device is within a coverage area of which the home network provides services and, as such, the mobile device is transferred to the home network. By way of example only, upon determining that one or more of the active mobile-network attributes correlate to one or more of the transition based data, an active call utilizing a roaming network is discontinued, and a connection with a home network is acquired through a hard handoff. As can be appreciated, a hard handoff or a soft handoff can be utilized to transfer an active mobile device from one wireless telecommunications network (e.g., a roaming network) to another wireless telecommunications network (e.g., a home network).

Figure 3:
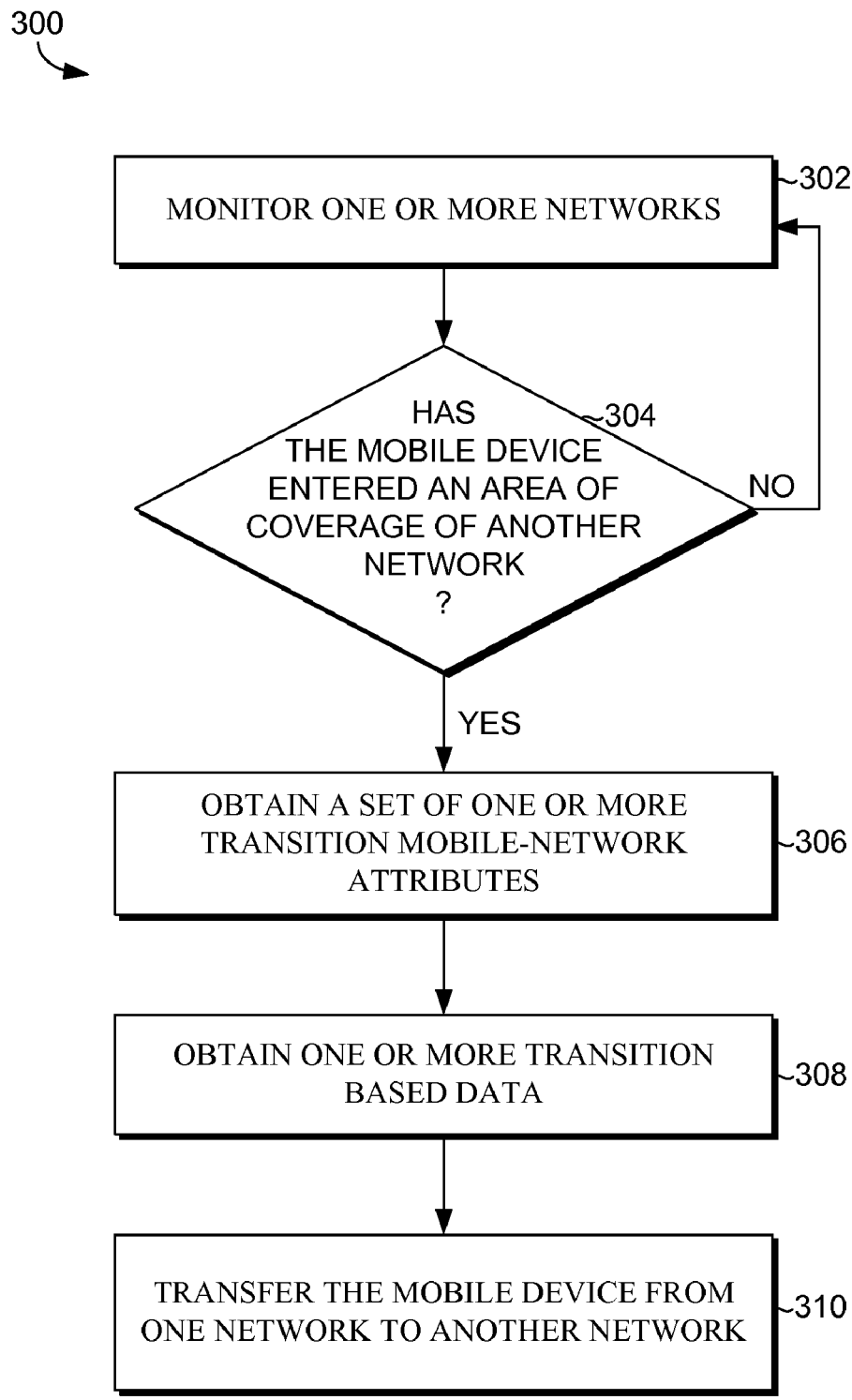
FIG. 3 is a flow diagram illustrating a further exemplary method for obtaining transition-based data in association with an idle mobile device is illustrated, in accordance with an embodiment of the present invention.

Turning now to FIG. 3, an exemplary method 300 for obtaining transition-based data in association with an idle mobile device is illustrated. When a mobile device is in an idle mode, transition-based data can be obtained. Such transition-based data can be utilized to reduce mobile device roaming of an active mobile device. Initially, as indicated at step 302, one or more networks are monitored. Monitoring a network might include, for example, scanning for a particular wireless telecommunications network, attempting to login to or connect with a particular wireless telecommunications network, searching for a particular wireless telecommunications network, or the like. In one embodiment, the one or more networks, such as a roaming network and/or home network, are monitored periodically (e.g., upon a lapse of a time or time duration, upon an occurrence of an event, etc.) to detect availability of coverage that can be used by the mobile device. By way of example only, a roaming mobile phone in an idle mode, or a computing device in association with the mobile phone, might monitor (e.g., attempt to connect with) a home network after a certain period of time (e.g., a two minute interval) in order to detect when the home network is available to provide services to the mobile device. In another embodiment, the one or more networks are monitored continuously to detect the availability of coverage that can be used by the mobile device.

At step 304 it is determined whether the mobile device has entered an area of coverage covered by another network, such as a home network. That is, a determination might be made as to whether the home network is available to provide services to the mobile device. Such a determination might be made, for example, upon scanning for the home network or attempting to connect to the home network.

In some embodiments, prior to monitoring one or more networks and/or recognizing whether a home network is available, the mobile device might identify a mode of operation and/or a network being currently utilized by the device. For example, the mobile device might identify whether the mobile device is operating in an idle mode and/or whether the mobile device is roaming. In such an embodiment, upon identifying that the mobile device is roaming in an idle mode, the mobile device, or other associated computing device, can accordingly monitor one or more networks and/or recognize availability of a home network.

If it is determined at step 304 that the mobile device has not entered an area of coverage of another network (e.g., a home network), the method returns to step 302 at which one or more networks are monitored. If, however, it is determined that the mobile device has entered an area of coverage covered by another network, a set of one or more transition mobile-network attributes is captured or obtained. This is indicated at step 306. The captured transition mobile-network attributes, or a portion thereof, might be stored in connection with the mobile device or another computing device (e.g., server) or data store associated with a wireless telecommunications network, such as a home network or roaming network. In one embodiment, transition mobile-network attributes are captured in association with a roaming network. As such, the transition mobile-network attributes describe the roaming network in relation to the mobile device at or near the time the mobile device can transition or transfer from the roaming network to the home network (i.e., the home network is available to provide services to the mobile device). Accordingly, transition mobile-network attributes corresponding with the roaming network might be captured before switching from a roaming network to a home network. In an alternative embodiment, transition mobile-network attributes are captured in association with a home network.

As indicated in step 308, transition-based data are obtained. As previously mentioned, a transition-based data is based on one or more corresponding transition mobile-network attributes associated with one or more mobile devices. In one embodiment, transitioned-based data might be the most recently captured transition mobile-network attribute. Alternatively, transition-based data might be generated using a collection of transition mobile-network attributes. In such a case, corresponding transition mobile-network attributes might be averaged, aggregated, or otherwise calculated such that transition-based data are obtained. The transition-based data, or a portion thereof, might be stored in connection with the mobile device or another computing device (e.g., server) or data store associated with a wireless telecommunications network, such as a home network or roaming network.

At block 310, the mobile device is transferred to another network, such as the home network of the mobile device. As can be appreciated, transferring a mobile device in an idle mode from one network to another network can occur before, after, or simultaneous to obtaining transition mobile-network attributes and/or transition-based data. By way of example only, transition mobile mobile-network attributes might be obtained prior to an idle mobile device transferring from a roaming network to a home network, while transition-based data might be generated after the idle mobile device transfers from the roaming network to the home network.

Figure 4:
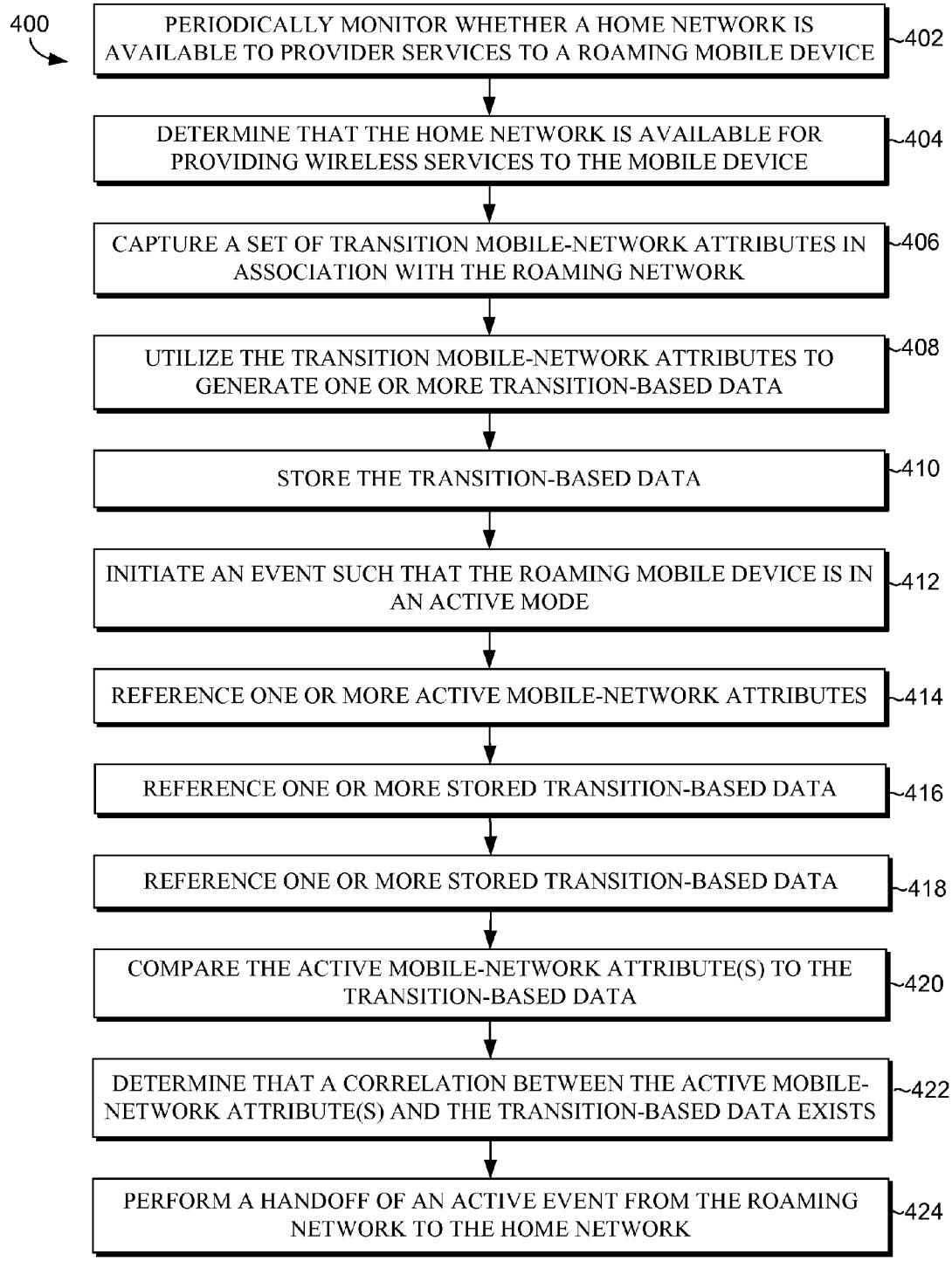
FIG. 4 is a flow diagram illustrating another exemplary method for reducing mobile device roaming, in accordance with an embodiment of the present invention.

Referring now to FIG. 4, a flow diagram is illustrated showing a method 400 for reducing mobile device roaming. Initially, as indicated at step 402, a roaming mobile device in an idle mode periodically monitors whether a home network is available to provide services to the mobile device. At step 404, it is determined that the home network is available for providing wireless services (e.g., phone services) to the mobile device. The mobile device captures a set of transition mobile-network attributes in association with the roaming network. This is indicated at step 406. Such transition mobile-network attributes might be mobile-network attributes associated with an idle-mode mobile device utilizing a roaming network just prior to switching to a home network. At step 408, the mobile device utilizes the transition mobile-network attributes to generate one or more transition-based data. The transition-based data might include a combination of transition mobile-network attributes, a comparison of transition mobile-network attributes, or an average of transition mobile-network attributes wherein the transition mobile-network attributes are captured over a period of time. At step 410, the one or more transition-based data are stored. The transition-based data might be stored on the mobile device. Alternatively, the transition-based data might be stored on a server or some other computing device associated with the home and/or roaming network.

At step 412, the roaming mobile device initiates an event (e.g., a phone call) such that the mobile device is in an active mode (e.g., the mobile device is on an active call utilizing a roaming network). The active mobile device references one or more active mobile-network attributes. This is indicated at step 414. Such active mobile-network attributes might be referenced as the mobile device, or other computing device associated with the roaming network, monitors the current conditions or characteristics of the roaming network with respect to the mobile device. At step 416, one or more stored transition-based data are referenced.

Upon referencing one or more active mobile-network attributes and one or more stored transition-based data, at step 418, the mobile device compares the active mobile-network attributes to the transition-based data at step 420. Based upon this comparison, the mobile device in step 422 determines that a correlation between the active mobile-network attributes and the transition-based data exists. Such a correlation provides an indication that the roaming mobile device entered or is about to enter an area where an idle mode handoff to a home network previously occurred. As can be appreciated, a correlation between the active mobile-network attributes and the transition-based data can be a correlation to any extent (e.g., an exact or similar) and/or between any number of attributes and data (e.g., all, a predetermined portion, etc.). Accordingly, it can be predicted that the active mobile device can begin utilizing services of the home network. Because it is determined that a correlation between the active mobile-network attributes and the transition-based data exists, the mobile device performs a handoff (e.g., hard handoff or soft handoff) of an active event, such as an active call, from the roaming network to the home network. This is indicated at step 424.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for reducing mobile device roaming when the mobile device is in an idle mode while utilizing a roaming network, the method comprising:
   determining that a home network of the mobile device is available to provide one or more services to the mobile device;
   based on the determination that the home network is available to provide the one or more services to the mobile device, capturing one or more transition mobile-network attributes that are parameters of the roaming network in association with the mobile device at or near the time that the home network is determined to be available to provide the one or more services to the mobile device, the one or more transition mobile-network attributes comprising at least one of a location data that indicates a location of the mobile device or a network data associated with the roaming network that indicates a noise data, a signal strength data, a system identification, a network identification, an interference data, a pilot strength data, or a combination thereof; and
   utilizing the one or more transition mobile-network attributes to generate one or more transition-based data that characterize the one or more transition mobile-network attributes, wherein each of the one or more transition-based data comprises a most recent transition mobile-network attribute or a collection of transition mobile-network attributes that are aggregated or averaged over a time period.

2. The one or more computer-readable media of claim 1 further comprising recognizing an operation mode of the mobile device, wherein the operation mode comprises at least one of an idle mode or an active mode.

3. The one or more computer-readable media of claim 1 further comprising monitoring one or more available networks to establish a connection with the home network at least one of periodically, continuously, or based on the occurrence of an event.

4. The one or more computer-readable media of claim 1, wherein the one or more transition mobile-network attributes comprise one or more of active set pseudo noise data, active set pseudo noise signal strength data, neighbor set pseudo noise data, neighbor set pseudo noise signal strength data, system identification data, network identification data, location data, pilot strength data, and interference data.

5. The one or more computer-readable media of claim 1 further comprising recognizing that the mobile phone is operating in the idle mode.

6. One or more non-transitory computer-readable media having computer-executable instructions embodied thereon that, when executed, perform a method for reducing mobile device roaming when the mobile device is in an active mode while utilizing a roaming network, the method comprising:
   referencing one or more active mobile-network attributes, wherein the active mobile-network attributes are associated with parameters of the mobile device and the roaming network when the mobile device is using the roaming network for an active call;
   referencing one or more stored transition-based data, each of the transition-based data comprising a calculation of a set of transition mobile-network attributes, wherein each of the transition mobile-network attributes is associated with parameters of the mobile device and the roaming network before the mobile device previously roaming in an idle mode switched from the roaming network to a home network, each of the transition mobile-network attributes comprising at least one of a location data that indicates a location of the mobile device or a network data associated with the roaming network that indicates a noise data, a signal strength data, a system identification, a network identification, an interference data, a pilot strength data, or a combination thereof; and
   comparing the one or more active mobile-network attributes to the corresponding transition-based data to determine whether the active mobile-network attributes match the transition based data at least to an extent; and based on the comparison, recognizing that the mobile device is within an area that can receive one or more services from the home network.

7. The one or more computer-readable media of claim 6, wherein the active mobile-network attributes comprise one or more of active set pseudo noise data, active set pseudo noise signal strength data, neighbor set pseudo noise data, neighbor set pseudo noise signal strength data, system identification data, network identification data, location data, pilot strength data, and interference data.

8. The one or more computer-readable media of claim 6, wherein the one or more active mobile-network attributes are referenced at least one of periodically, continuously, or based on the occurrence of an event.

9. The one or more computer-readable media of claim 6, wherein the one or more transition-based data is stored on the mobile device, a server, or a combination thereof.

10. The one or more computer-readable media of claim 6, wherein the transition-based data comprising a collection of a set of transition mobile-network attributes, is captured over a predetermined period.

11. The one or more computer-readable media of claim 6, further comprising performing a handoff of the active call from the roaming network to the home network.

12. The one or more computer-readable media of claim 6, wherein handoff of the active call from the roaming network to the home network comprises a hard handoff or a soft handoff.

13. One or more non-transitory computer-readable media having computer-executable instructions embodied thereon that, when executed, perform a method for reducing mobile device roaming, the method comprising:
   capturing one or more transition mobile-network attributes that are parameters of a roaming network being used by the mobile device in idle mode in accordance with a determination that a home network of the mobile device is available to provide one or more services to the mobile device;
   utilizing the one or more transition mobile-network attributes to obtain one or more transition-based data that characterize the one or more transition mobile-network attributes, the one or more transition mobile-network attributes comprising at least one of a location data that indicates a location of the mobile device or a network data associated with the roaming network that indicates a noise data, a signal strength data, a system identification, a network identification, an interference data, a pilot strength data, or a combination thereof;
   storing the one or more transition-based data;
   initiating an active phone call via the mobile phone using the roaming network;
   referencing the one or more stored transition-based data and one or more corresponding active mobile-network attributes, wherein the active mobile-network attributes are associated with parameters of the mobile device and the roaming network when the mobile device is on the active phone call using the roaming network;
   recognizing that at least a portion of the one or more stored transition-based data match at least to an extent the one or more corresponding active mobile-network attributes; and
   based on the recognition, transferring the mobile device on the active phone call from the roaming network to the home network.

14. The one or more computer-readable media of claim 13, wherein the active mobile-network attributes comprises one or more of active set pseudo noise data, active set pseudo noise signal strength data, neighbor set pseudo noise data, neighbor set pseudo noise signal strength data, system identification data, network identification data, location data, pilot strength data, and interference data.

15. The one or more computer-readable media of claim 13, wherein the transition mobile-network attributes comprises one or more of active set pseudo noise data, active set pseudo noise signal strength data, neighbor set pseudo noise data, neighbor set pseudo noise signal strength data, system identification data, network identification data, location data, pilot strength data, and interference data.

16. The one or more computer-readable media of claim 13, wherein the one or more transition-based data comprise at least one of a combination, a comparison, and an average of transition mobile-network attributes captured over a predetermined time period.

17. The one or more computer-readable media of claim 13, wherein the one or more active mobile-network attributes are referenced at least one of periodically, continuously, or based on the occurrence of an event.

18. The one or more computer-readable media of claim 13, wherein the mobile device on the active phone call is transferred from the roaming network to the home network via a hard handoff or a soft handoff.

* * * * *